(12) United States Patent
Das

(10) Patent No.: US 10,523,757 B2
(45) Date of Patent: *Dec. 31, 2019

(54) INTERCONNECT DELIVERY PROCESS

(71) Applicant: NetApp Inc., Sunnyvale, CA (US)

(72) Inventor: Dhananjoy Das, Salt Lake City, UT (US)

(73) Assignee: NetApp Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,801

(22) Filed: Nov. 14, 2017

(65) Prior Publication Data

US 2018/0139281 A1 May 17, 2018

Related U.S. Application Data

(63) Continuation of application No. 14/953,086, filed on Nov. 27, 2015, now Pat. No. 9,826,037, which is a continuation of application No. 14/513,597, filed on Oct. 14, 2014, now Pat. No. 9,215,278, which is a continuation of application No. 13/288,764, filed on Nov. 3, 2011, now Pat. No. 8,874,680.

(51) Int. Cl.
| | |
|---|---|
| *H04L 29/08* | (2006.01) |
| *G06F 13/28* | (2006.01) |
| *G06F 3/06* | (2006.01) |
| *G06F 12/0831* | (2016.01) |
| *G06F 15/173* | (2006.01) |

(52) U.S. Cl.
CPC .......... *H04L 67/1097* (2013.01); *G06F 3/061* (2013.01); *G06F 3/0655* (2013.01); *G06F 3/0688* (2013.01); *G06F 12/0833* (2013.01); *G06F 13/28* (2013.01); *G06F 15/17331* (2013.01); *H04L 67/1095* (2013.01); *H04L 67/2842* (2013.01); *G06F 2212/62* (2013.01)

(58) Field of Classification Search
None
See application file for complete search history.

(56) References Cited

U.S. PATENT DOCUMENTS

| | | |
|---|---|---|
| 6,725,392 B1 | 4/2004 | Frey et al. |
| 7,657,509 B2 | 2/2010 | Clark et al. |
| 8,402,226 B1 | 3/2013 | Faibish et al. |
| 8,429,138 B2 | 4/2013 | Apostolopoulos et al. |
| 8,442,952 B1 | 5/2013 | Armangau et al. |
| 8,806,056 B1 * | 8/2014 | Majee .................... H04L 67/06 709/237 |

(Continued)

OTHER PUBLICATIONS

Non-Final Office Action cited in U.S. Appl. No. 13/288,764 dated Jun. 6, 2013, 36 pgs.

(Continued)

*Primary Examiner* — Younes Naji

(74) *Attorney, Agent, or Firm* — Cooper Legal Group, LLC

(57) ABSTRACT

A method for enforcing data integrity in an RDMA data storage system includes flushing data write requests to a data storage device before sending an acknowledgment that the data write requests have been executed. An RDMA data storage system includes a node configured to flush data write requests to a data storage device before sending an acknowledgment that a data write request has been executed.

20 Claims, 8 Drawing Sheets

(56) References Cited

U.S. PATENT DOCUMENTS

| | | | |
|---|---|---|---|
| 2002/0078315 A1* | 6/2002 | Howard | G06F 11/2064 |
| | | | 711/162 |
| 2003/0065860 A1* | 4/2003 | Lester | G06F 13/4031 |
| | | | 710/305 |
| 2003/0172316 A1 | 9/2003 | Tremblay et al. | |
| 2005/0015385 A1* | 1/2005 | Chinner | G06F 16/10 |
| 2006/0045099 A1 | 3/2006 | Chang et al. | |
| 2007/0266028 A1 | 11/2007 | Muller et al. | |
| 2009/0037653 A1 | 2/2009 | Brokenshire et al. | |
| 2009/0106771 A1 | 4/2009 | Benner et al. | |
| 2009/0177836 A1* | 7/2009 | Mimatsu | G06F 16/122 |
| | | | 711/111 |
| 2010/0049918 A1 | 2/2010 | Noguchi et al. | |
| 2010/0229173 A1 | 9/2010 | Subrahmanyam et al. | |
| 2011/0010720 A1 | 1/2011 | Smith et al. | |
| 2011/0078467 A1 | 3/2011 | Hildebrand | |
| 2011/0167239 A1* | 7/2011 | Horn | G06F 11/34 |
| | | | 711/171 |
| 2011/0246686 A1* | 10/2011 | Cavanagh, Jr. | G06F 13/28 |
| | | | 710/22 |
| 2013/0042067 A1 | 2/2013 | Thomas | |

OTHER PUBLICATIONS

Reply Non-Final Office Action cited in U.S. Appl. No. 13/288,764 dated Sep. 6, 2013, 10 pgs.
Final Office Action cited in U.S. Appl. No. 13/288,764 dated Oct. 2, 2014, 52 pgs.
Reply Final Office Action cited in U.S. Appl. No. 13/288,764 dated Apr. 28, 2014, 10 pgs.
Notice of Allowance cited in U.S. Appl. No. 13/288,764 dated Jul. 8, 2014, 18 pgs.
Notice of Allowance cited in U.S. Appl. No. 13/288,764 dated Sep. 11, 2014, 14 pgs.
Preliminary Amendment cited in U.S. Appl. No. 14/513,597 dated Oct. 14, 2014, 8 pgs.
Notice of Allowance cited in U.S. Appl. No. 14/513,597 dated Oct. 13, 2015, 18 pgs.
Amendment after Notice of Allowance cited in U.S. Appl. No. 14/513,597 dated Oct. 30, 2015, 9 pgs.
Non-Final Office Action cited in U.S. Appl. No. 14/953,086 dated Mar. 16, 2016, 40 pgs.
Reply Non-Final Office Action cited in U.S. Appl. No. 14/953,086 dated Apr. 29, 2016, 15 pgs.
Final Office Action cited in U.S. Appl. No. 14/953,086 dated Aug. 12, 2016, 62 pgs.
Reply Final Office Action cited in U.S. Appl. No. 14/953,086 dated Oct. 5, 2016, 16 pgs.
Non-Final Office Action cited in U.S. Appl. No. 14/953,086 dated Feb. 10, 2017, 46 pgs.
Reply Non-Final Office Action cited in U.S. Appl. No. 14/953,086 dated May 10, 2017, 16 pgs.
Notice of Allowance cited in U.S. Appl. No. 14/953,086 dated Jun. 8, 2017, 21 pgs.

* cited by examiner

INTERCONNECT DELIVERY PROCESS

RELATED APPLICATIONS

This application is a continuation of U.S. patent application Ser. No. 14/953,086, titled "INTERCONNECT DELIVERY PROCESS" and filed on Nov. 27, 2015, which is a continuation of U.S. Pat. No. 9,215,278, titled "INTERCONNECT DELIVERY PROCESS" and filed on Oct. 14, 2014, which is a continuation of U.S. Pat. No. 8,874,680, titled "INTERCONNECT DELIVERY PROCESS" and filed on Nov. 3, 2011, which are incorporated herein by reference.

FIELD OF THE INVENTION

The present invention is directed generally toward data storage systems, and particularly, to out of order delivery for data and metadata mirroring in a cluster storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. A "disk" may refer to a hard disk drive (HDD), a solid state drive (SSD) or any other persistent data storage technology.

The storage system may be configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing access requests (read/write requests) as file-based and block-based protocol messages (in the form of packets) to the system over the network.

One type of data storage system configured to operate on a client/server model is remote direct memory access (RDMA). RDMA allows a local computer to directly access the memory of a remote computer without involving the remote computer's operating system. RDMA permits high-throughput, low-latency networking, which is especially useful in massively parallel computer clusters. When an application performs an RDMA Read or Write request, the application data is delivered directly to the network, reducing latency and enabling fast message transfer.

In an RDMA system, the local computer or local "node" is not notified of the completion of the operation when a request is posted. The completions on I/O operations are reported asynchronously. Completions are usually reported by events or completions can be polled using CPU cycles, but these mechanisms increase the memory footprint and network latency.

RDMA may be useful in applications such as remote mirroring of data. Currently, remote mirroring of data implements an "in-order delivery" (IOD) requirement, whereby mirroring applications and connections between the nodes typically support in-order delivery of data between the nodes. For in-order delivery of data, the data is expected to be received at the remote node in the same time order as it was sent at the local node. For example, if data sets are sent at the local node in a time order comprising data sets W, X, and then Y, the IOD requirement requires that the remote node receives the data sets in the same time order (i.e., receive in order W, X, and then Y). IOD of data results when there is a single connection path between the local and remote nodes.

In contrast, "out-of-order delivery" (OOD) of data results when there are multiple connection paths between the local and remote nodes. Multiple connection paths may be implemented to increase data throughput and bandwidth between nodes. For OOD of data, the data is not expected to be received at the remote node in the same time order as it was sent at the local node and may arrive in any order. As such, in the above example, data set Y may arrive at the remote node prior to data sets W and X in OOD.

OOD of data from the local node to the remote node may compromise data integrity at the remote node. Typically, for a group of related data sets (e.g., data sets W, X, Y), there may also be a metadata set (e.g., metadata set Z) that describes each of the related data sets (e.g., metadata set Z describes data sets W, X, Y), the metadata set to also be stored to the local and remote non-volatile storage devices. As used herein, a "related group" of data and metadata sets may comprise one or more data sets and one metadata set that describes and is associated with each of the one or more data sets. As used herein, "data integrity" exists when the metadata set of a related group is written to the remote non-volatile storage device only after each of the data sets within the related group is written to the remote non-volatile storage device. If the metadata set of a related group is written before each of the data sets within the same related group is written, data corruption and inconsistency in the remote non-volatile storage device may result.

For example, the data sets of a related group may comprise data sets W, X, Y and metadata set Z, where metadata set Z specifies that there are 3 valid data sets and the time order of transmitting to the remote node is W, X, Y, and then Z. A "valid" data set may comprise client data that is pending to be stored to the local and remote non-volatile storage devices. In IOD of data, data integrity is intact since the time order of receiving and writing to the remote node is also W, X, Y, and then Z (where metadata set Z is written to the remote non-volatile storage device only after data sets W, X, and Y are written). When the metadata set Z is written to the remote non-volatile storage device, this indicates that 3 valid data sets have already been successfully written to the remote non-volatile storage device. As such, in IOD of data, the data and metadata stored at the remote node would be consistent as metadata set Z written to the remote non-volatile storage device would accurately reflect that 3 valid data sets W, X, and Y have been written to the remote non-volatile storage device.

However, in OOD of data, data integrity may not exist if, for example, metadata set Z is received and written to the remote node prior to data sets X and Y. In this example, the data and metadata stored at the remote node would not be consistent as metadata set Z being written to the remote non-volatile storage device would indicate that the 3 valid data sets W, X, and Y have already been written to the remote non-volatile storage device, when this in fact is not true. If a crash were to occur at the remote node before data sets X and Y were written to the remote non-volatile storage device, data corruption at the remote non-volatile storage device would result. As such, use of OOD of data typically does not provide data integrity at the remote non-volatile storage device at each point in time.

IOD for remote mirroring has significant drawbacks. For example, multiple connection paths between the nodes may be used to increase data throughput and connection bandwidth between nodes. However, multiple connection paths between nodes may cause OOD of data. As such, IOD of data for remote mirroring may not take advantage of the increased data throughput and connection bandwidth provided by multiple connection paths between the nodes and OOD of data. However, in implementations of OOD, data integrity is at risk because the sending or local node does not have any indication that all data has been received. The local node may therefore send subsequent data write requests or metadata write requests before data has been written to a persistent data storage device, or even before all previous data write requests have been received. As such, there is a need for an improved method for remote mirroring of data and metadata between nodes of a cluster storage system. Consequently, it would be advantageous if a method and apparatus existed that are suitable for enforcing data integrity during OOD delivery through an execution thread on a remote node in a RDMA data storage system.

SUMMARY OF THE INVENTION

Accordingly, the present invention is directed to a novel method and apparatus for enforcing data integrity during OOD delivery through an execution thread on a remote node in a RDMA data storage system.

One embodiment of the present invention includes a RDMA data storage system having a processor, memory and a data storage device. The processor maintains an execution thread to monitor incoming data write requests and execute flush operations when necessary. The processor receives one or more data write requests through multiple independent pathways, executes the one or more data write requests to a cache and flushes newly written data to the data storage device. A "flush" is an operation to mirror data stored in a cache to a persistent data storage device; flushing ensures that data is stored in at least one location other than volatile memory. The processor then sends an acknowledgement that the one or more data write requests have been flushed and waits to receive a metadata write request related to the one or more data write requests.

Another embodiment of the present invention includes a RDMA data storage system having a processor, memory and a data storage device. The processor de-sequences one or more data write requests, sends the one or more data write requests through multiple independent pathways, then waits for an acknowledgment that the one or more data write requests have been flushed. The processor then sends one or more metadata write requests related to the one or more data write requests.

Another embodiment of the present invention includes a method for enforcing data integrity in a RDMA data storage system. Such method includes receiving one or more data write requests, executing the one or more data write requests and flushing newly written data to the a storage device. After flushing, the method further includes sending an acknowledgement that the one or more data write requests have been flushed and waiting to receive one or more metadata write requests related to the one or more data write requests.

Another embodiment of the present invention includes a method for writing data to a RDMA data storage system that enforces data integrity. Such method includes de-sequencing one or more data write requests, sending the one or more data write requests, then waiting for an acknowledgment that the one or more data write requests have been flushed. When the acknowledgement has been received, sending one or more metadata write requests related to the one or more data write requests.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
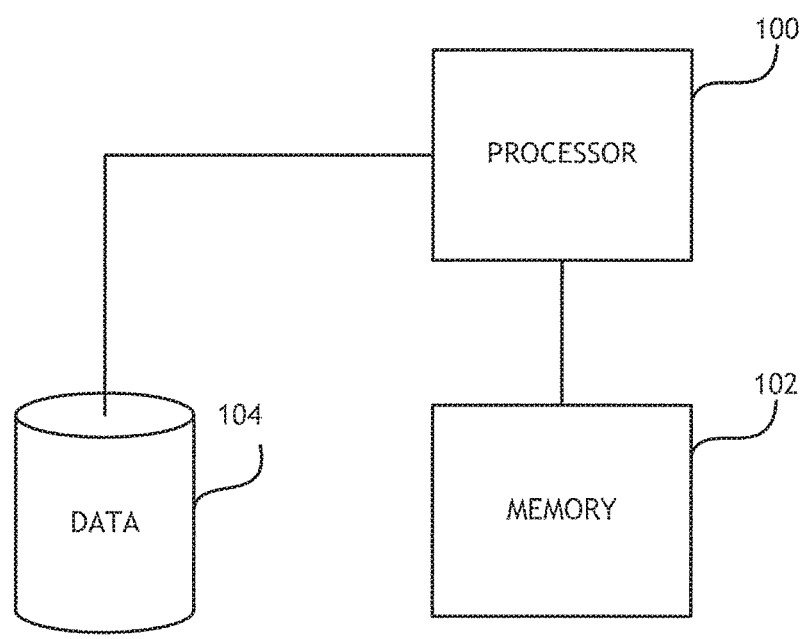
FIG. 1 shows block diagram of a system for implementing embodiments of the present invention.

Referring to FIG. 1, a computer in a RDMA data storage system according to an embodiment of the present invention includes a processor 100 connected to a memory 102 and a data storage device 104. The processor 100 may execute program instructions to perform embodiments of the present invention. Program instructions should be understood to encompass software, firmware or any equivalent of software or firmware. The processor 100 may receive one or more data write requests in parallel through a plurality data pathways. The one or more data write requests may be maintained in a queue. The one or more data write requests may be written to the memory 102 where the memory 102 is configured as a cache. The processor 100 may flush data written to the memory 102 to a data storage device 104. When data has been flushed to the data storage device 104, the processor 100 may send one or more acknowledgements indicating that the data write requests have been flushed to the data storage device 104. The processor 100 may then wait for a metadata write request related to the data write requests. The processor may poll a specific memory address for a metadata write flag indicating that a write request is a metadata write request. The processor 100 may then execute the metadata write request.

Computers in a RDMA data storage system provide remote access to data storage devices without any processor intervention by the remote computer. The users of interconnect services rely on in order delivery of any I/O operations posted as interconnect services work on serialized operations and thus for legacy purposes write requests must be sequential. At least one embodiment of the present invention is a remote computer in a RDMA system with a processor configured to maintain and execute of queue of one or more data write requests where the one or more data write requests may be received non-sequentially, and actively send acknowledgements pertaining to each of the one or more data write requests. Each of the one or more data write requests may include an explicit request for an acknowledgment from the remote computer, or remote computer may be configured to send an acknowledgement for each data write request without an explicit request.

Figure 2:
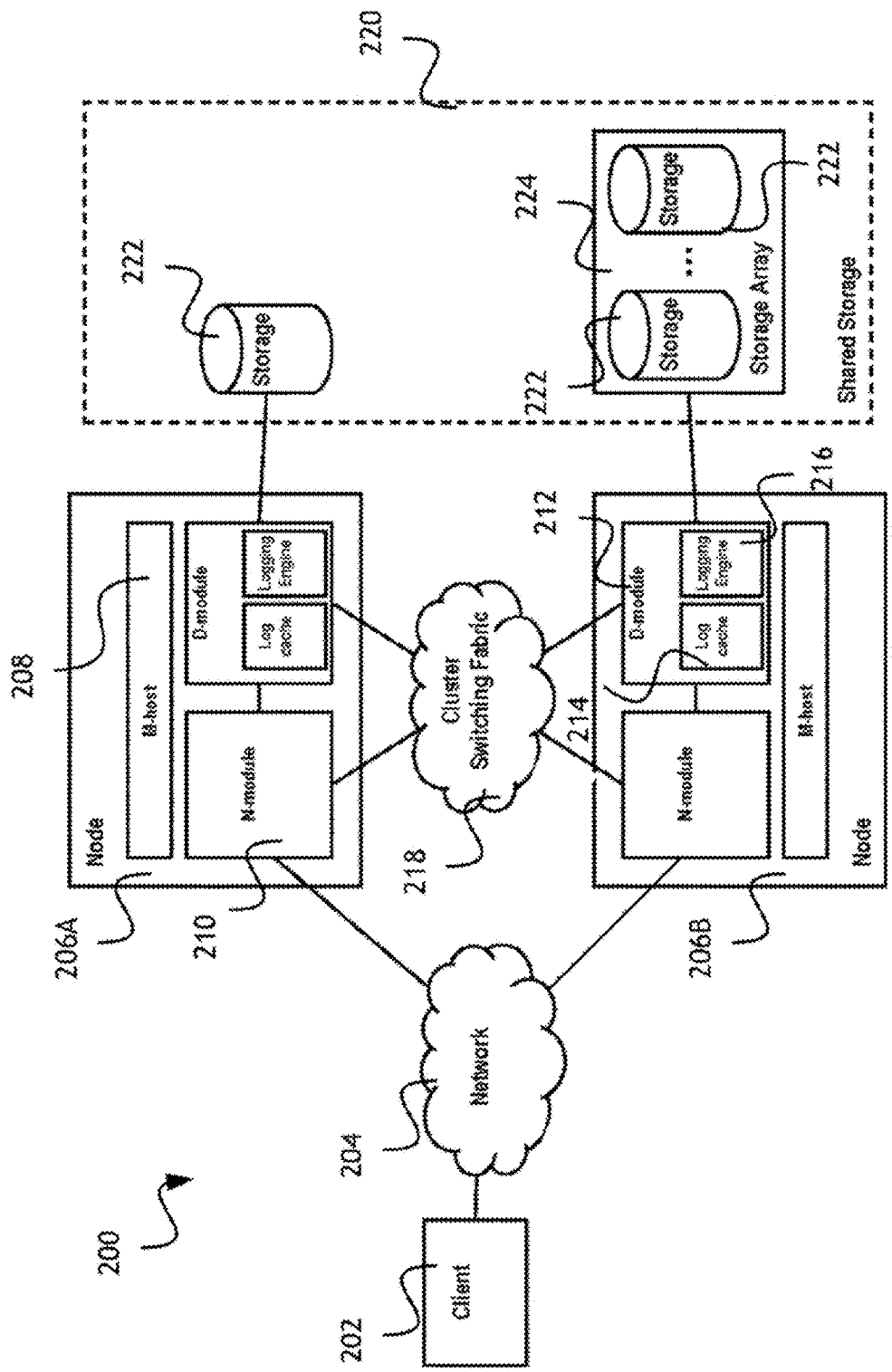
FIG. 2 shows a block diagram of an exemplary cluster environment in which some embodiments operate.

Referring to FIG. 2, a block diagram of an exemplary cluster environment 200 utilizing embodiments of the present invention is shown. The exemplary cluster environment 200 may comprise multiple interconnected storage systems 206A, 206B (each referred to as a "node") configured to provide storage services for a set of storage devices 222. Storage devices 222 may include hard disk drives, solid state storage devices such as flash memory, non-volatile storage device (NVRAM), Magnetic Random Access Memory (MRAM), Phase Change RAM (PRAM), or any other data storage technologies. The nodes 206 may be interconnected by a cluster switching fabric 218 and may comprise various functional components that cooperate to provide a distributed storage system architecture of the exemplary cluster environment 200. Each node 222 may be organized as a network element (N-module 210), a data element (D-module 212), and a management element (M-host 208). The N-module 210 may include functionality to enable the node 222 to connect to one ore more clients 202 over a computer network 204, while each D-module 212 connects to one or more storage devices 222. The one or more storage devices may be configured as a storage array 222. The D-module 212 may comprise the processor 100 and memory 102 illustrated in FIG. 1. The M-host 208 may further provide cluster communication services between nodes 206 for generating information sharing operations to present a distributed file system image for the exemplary cluster environment 200.

It should be noted that while there is shown an equal number of N-modules 210 and D-modules 212, there may be differing numbers of N-modules 210 and D-modules 212, and different types of functional components implementing each node 206 in accordance with various embodiments. For example, there may be multiple N-modules 210 and D-modules 212 interconnected in the exemplary cluster environment 200 that do not reflect a one-to-one correspondence between the N-modules 210 and D-modules 212 of each node 206. As such, the description of each node 206 comprising only one N-module 210 and one D-module 212 should be taken as illustrative only. For instance, a node 206A may also have one N-module 210 and a plurality of D-modules 212, a plurality of N-modules 210 and one D-module 212, or a plurality of N-modules 210 and a plurality of D-modules 212. In addition, the functional components of the N-modules 210 and D-modules 212 may be implemented in other components of each node 206 so the novel techniques are not limited to the illustrative embodiment discussed herein.

Clients 202 may be general-purpose computers configured to communicate with nodes 206 in accordance with a client/server model of information delivery. That is, each client 202 may request the services of a node 206 by e.g., submitting a read or write request, and the node may return the results of the services requested by the client 202, by exchanging information packets over network 204. Client 202 may submit access requests by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, client 202 may submit access requests by issuing packets using block-based access protocols, such as the Small Computer Systems Interface (SCSI) protocol encapsulated over TCP (iSCSI) and SCSI encapsulated over Fibre Channel (FCP), when accessing information in the form of blocks.

In some embodiments, the totality of storage space provided by the storage devices 222 constitute shared storage 220 which may be commonly accessed by the nodes 206. Shared storage 220 may be accessible by each D-module 212 of each node 206; for instance, to provide a high availability of service to clients 202 by protecting against a failure of one of nodes 206 or increasing performance of exemplary cluster environment 200. As an example, a write request from the client 202 may be received by any of nodes 206 and carried out on storage array 220 by virtue of each D-module 212 having access to shared storage 220.

To optimize system resources during periods where a high volume of access requests are serviced by a node 206, each node 206 may implement a log cache 214, constituting one or more write logs. A write log may, for instance, include information provided by client 202 in a write request, such as a volume identifier and the actual data to be written to a storage device 222 of the shared storage 220. Write logs may then be grouped in log caches for a predetermined period of time and then stored to a storage device 222. For example, the predetermined time may be during an off-peak request period for the exemplary cluster environment 200.

In an RDMA system configured as in the exemplary cluster environment 200, one node may be configured as a local node 206A and another node may be configured as a remote node 206B. The client 202 may send write requests through the local node 206A, to the remote node 206B. The remote node 206B may then execute the write request to a storage device 222. Write requests in an RDMA system may be followed by an operation to update metadata associated with the data modified by the write request. In a contemporary RDMA system, data may be corrupted if a local node 206A sends a first write request and metadata to a remote node 206B, and then sends a second, subsequent write request to modify the same data to the remote node 206B before the metadata has been flushed to a storage device 222. In an RDMA system according the present invention, the remote node 206B may flush metadata to a storage device 222 and then send a confirmation that the metadata was flushed to the local node 206A. The local node 206A may block subsequent write requests related to the same data until the local node 206A receives the confirmation that the metadata has been flushed to a storage device 222.

Figure 3:
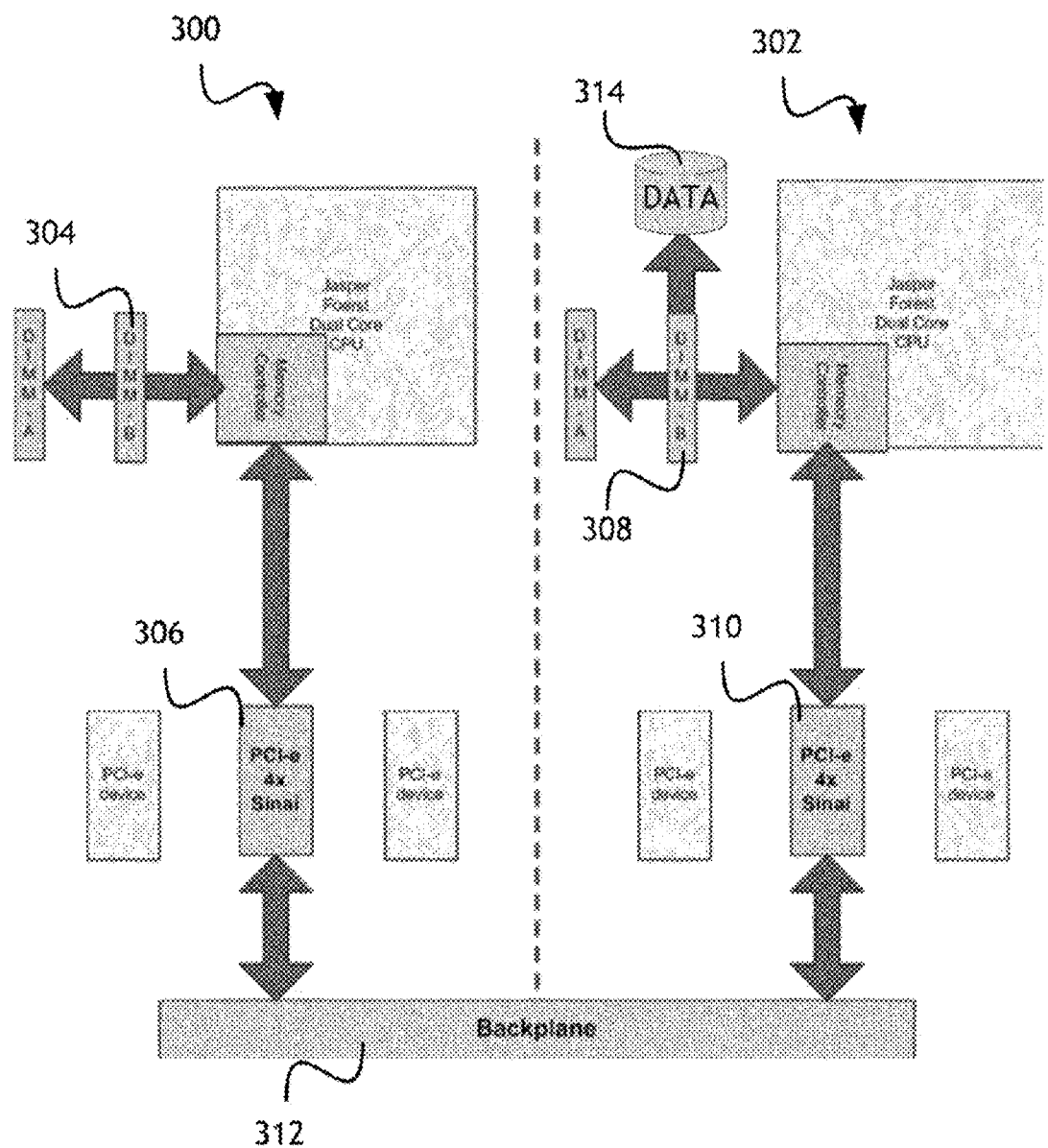
FIG. 3 shows a block diagram of data transfer paths in a system of two nodes implementing embodiments of the present invention.

Referring to FIG. 3, two nodes 300 and 302 in a remote direct memory access (RDMA) system implementing embodiments of the present invention are shown. RDMA operations are a mode of I/O across two nodes without the involvement of a processor on the remote node 302. This provides for greater performance benefits as the remote node 302 processor is usable for servicing other requests rather than for I/O between nodes. In an RDMA system according to an embodiment of the present invention, a local node 300 may send one or more data write requests through a network adapter 306 and background architecture 312, connecting to a remote node 302 through another network adapter 310. A memory controller in the remote node 302 may write the one or more data write requests to one or more dual in-line memory modules (DIMM) 308 without involvement from the processor of the remote node 302. The remote node 302 may induce a flush operation to push data written by the data write operation from the one or more DIMMs 308 to a data storage device 314 such as a non-volatile random access memory (NVRAM) hard-disk drive, a solid state drive (SSD) or any other data storage technology that may be useful in implementing an RDMA system. One skilled in the art will appreciate that an RDMA system may be implemented using a plurality of data storage technologies in a tiered data storage device. Flushing data from the one or more DIMMs 308 requires intervention by the processor in the remote node 302. After a flush operation pushes data to a data storage device 314, the remote node 302 acknowledges the data write request has been completed. The remote node 302 may maintain a queue of data write requests to be executed after a flush operation.

A data storage system thus configured may maintain data integrity even as data write requests are received through various paths, even though the order in which data write requests are received cannot be known. One skilled in the art will appreciate that even though an RDMA system having a two nodes 300 and 302 is shown, one skilled in the art will appreciate that the present invention is not limited to two nodes, and that the present invention may be implemented in a network having any number of nodes appropriate for an RDMA system.

Figure 4:
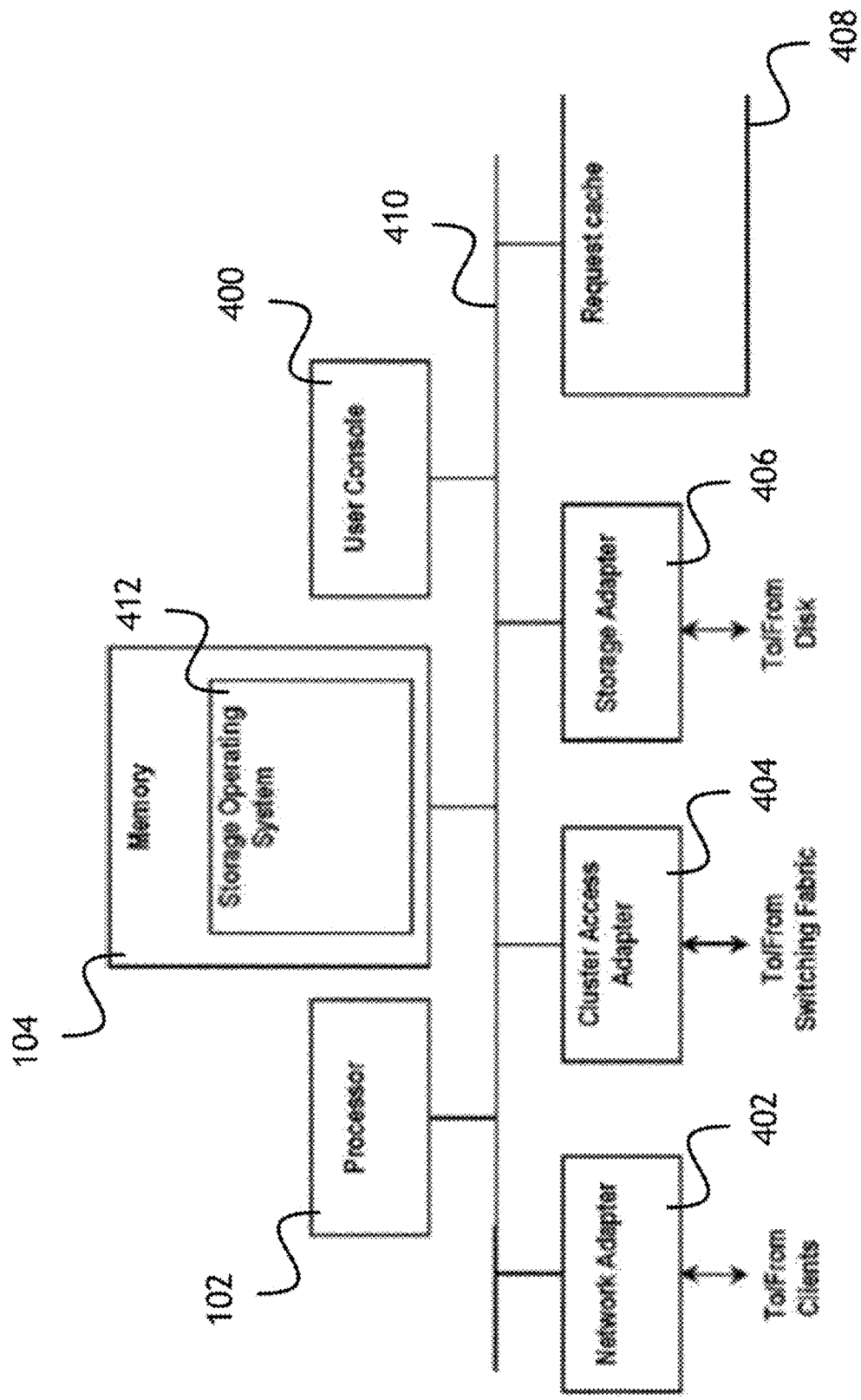
FIG. 4 shows a block diagram of an exemplary node that may be implemented in the exemplary cluster environment.

Referring to FIG. 4, a block diagram of an exemplary node 206 is shown. A node 206 may illustratively be embodied as a storage system comprising a processor 102, a memory 104, a network adapter 402, a cluster access adapter 404, a storage adapter 406 and non-volatile storage, e.g., request cache 408, interconnected by a system bus 410.

The network adapter 402 may comprise a plurality of ports adapted to couple the node 206 to one or more clients 202 over point-to-point links, wide area networks, virtual private networks implemented over a public network (Internet) or a shared local area network. The network adapter 402 may comprise the mechanical, electrical and signaling circuitry needed to connect the node to the network. Illustratively, a computer network 204 may be embodied as an Ethernet network or a Fibre Channel (FC) network. Each client 202 may communicate with the node 206 over the network 204 by exchanging discrete frames or packets of data according to pre-defined protocols, such as TCP/IP.

Cluster access adapter 404 may comprises a plurality of ports adapted to couple the node 206 to other nodes of the cluster through cluster switching fabric 218. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-module 210 and D-module 212 are implemented on separate storage systems or computers, cluster access adapter 404 may be utilized by the N-module 210 and D-module 212 for communicating with other N-modules 210 and D-modules 212 in the cluster 200. In yet other embodiments, more than one processor 102 may implement node 206, such that one processor executes the functions of N-module 210, while another processor executes the functions of D-module 212.

A node 206 is illustratively embodied as a storage system executing a storage operating system 412 that preferably implements a high-level layer of abstraction (e.g., file system) to logically organize the information as a hierarchical structure of data containers, such as volumes, directories, and files on the disks. Each "on-disk" file, for instance, may be implemented as a set of data structures, e.g., disk blocks, configured to store information such as the actual data for the file. Disk blocks may further be organized as a volume, where each volume may be, although is not necessarily, associated with its own file system.

Storage adapter 406 cooperates with storage operating system 412 executing on the node 206 to access information requested by clients 202. The information may be stored on any type of writable storage media such as disk drives, magnetic tape, flash memory, electronic random access memory, or any other media adapted to store information. However, as illustratively described, information is preferably stored on storage devices 222 configured as storage array 224. Storage adapter 406 comprises a plurality of ports having input/output (I/O) interface circuitry that couples to storage devices 222 over an I/O interconnect arrangement, such as a conventional high-performance, FC link topology. Storage array 424 may further constitute shared storage 220 of the cluster 200 which may be accessed by multiple nodes for increasing cluster performance and protecting against a failure of any single node.

Information on the storage array 224 is preferably organized as one or more volumes that comprise a collection of storage devices 222 cooperating to define an overall logical arrangement of volume block number (vbn) space on the volume(s). The disks within a volume/file system are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data.

Memory 104 illustratively comprises storage locations that are addressable by the processor 102 and the adapters 402, 404, 406 for storing program instructions and data in some embodiments. The processors 102 and adapters 402, 404, 406 may, in turn, comprise processing elements and/or logic circuitry configured to execute the instructions and manipulate the data stored in memory 104. In some embodiments, memory 104 may comprise a form of random access memory (RAM) comprising "volatile" memory that is generally cleared by a power cycle or other reboot operation.

The storage operating system 412, portions of which are typically resident in memory 104 and executed by the processing elements, functionally organizes the node 206 by invoking operations in support of the storage services implemented by the node. It will be apparent to those skilled in the art that other processing and memory means, including various computer readable media, may be used for storing and executing program instructions pertaining to the invention described herein. In some embodiments, the storage operating system 412 comprises a plurality of software layers that are executed by the processor 102.

A user console 400 may be implemented by the node 206 to allow a user (e.g., a storage administrator) to interface with the node 106 to supply inputs to or receive outputs from the node 106. Preferably, user console 400 may include a keyboard for receiving e.g., command line interface (CLI) inputs from the storage administrator and a monitor for displaying outputs generated by the node 106. As an example, the storage administrator may interface with user console 400 when configuring the node 106 to communicate with a failover partner for mirroring write logs between the nodes. It will be appreciated that other devices and/or components may implement user console 400, such as a computer remotely located and networked to the node 106.

One or more non-volatile storage devices may implement a request cache 408 for locally storing information relating to access requests from clients 102. Preferably, a request cache 408 may be implemented to store write logs corresponding to write requests from clients 102 in the event of an "ungraceful" system shutdown or other unforeseen problem where the system fails with unflushed data in the write cache. To that end, write logs may be generated by the storage operating system 412 upon receipt of a write request from a client 102 for carrying out the requested write operation at a later time. Note that the request cache 408 may include hard disks, flash memory, non-volatile random access memory (NVRAM), Magnetic Random Access Memory (MRAM), Phase Change RAM (PRAM), or any other type of media or device suitable for storing instructions and/or data thereon/in.

Figure 5:
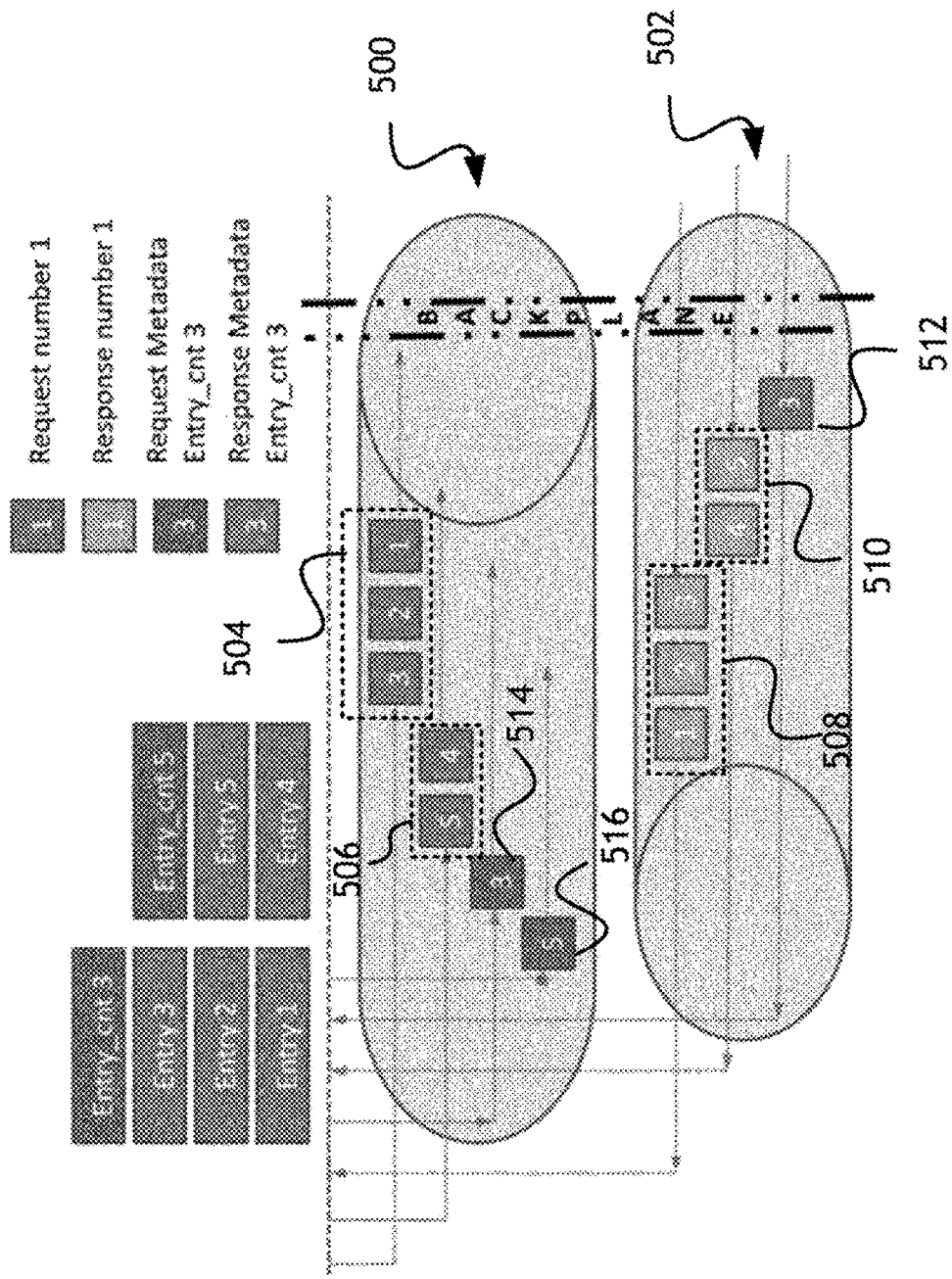
FIG. 5 shows a block diagram of the order of data transfers executed according embodiments of the present invention.

Referring to FIG. 5, a graphic illustration of a timeline for local node operations 500 and corresponding remote node operations 502. Local node operations 500 may include a first set of data write requests 504 and second set of data write requests 506. The first set of data write requests 504 may be unrelated to the second set of data write requests 506. The local node operations 500 may also include a first metadata write and flush request 514 related to the first set of data write requests 504 and a second metadata write request 516 related to the second set of data write requests 506. Remote node operations 502 may include a first acknowledgement 508 that the first set of data write requests 504 was flushed to a data storage device, such as the data storage device 104 shown in FIG. 1 or the data storage device 314 shown in FIG. 3, and a second acknowledgment 510 that the second set of data write requests 506 was flushed a data storage device. The remote node operations 502 may also include a metadata write and flush acknowledgement 512 associated with the first metadata write and flush request 514.

Where the local node in an RDMA data storage system, such as the local node 300 shown in FIG. 3, attempts to send data write requests to a remote node, such as the remote node 302 shown in FIG. 3, the local node may send a first set of data write requests 504 to the remote node by any available routing path. The local node may subsequently send an unrelated second set of data write requests 506. The remote node may receive the first set of data write requests 504 into a memory, including a DIMM and the remote node may receive the second set of data write requests 506 into a write request queue. The remote node may flush the data from the first set of data write requests 504 to a data storage device and then send a first acknowledgement 508 to acknowledge that the data from the first set of data write requests has been flushed to a data storage device. Once the local node receives the first acknowledgement 508, the local node may send a first metadata write request 514 related to the first set of data write requests 504. The remote node may then send a metadata write acknowledgement 512 acknowledging that the first metadata write request was executed. The remote node may similarly execute the second set of data write requests 506 and send a second acknowledgement 510 to acknowledge that the data from the second set of data write requests 506 has been flushed to a data storage device. Once the local node receives the second acknowledgement 510, the local node may send a second metadata write request 516 related to the second set of data write requests 506.

An RDMA system implementing an embodiment of the present invention to utilize a processor on a remote node to flush data and send acknowledgments may send data write requests by any available path rather than a single, serialized path. Such a system may utilize more bandwidth for data write requests, even though certain data write requests sent over different routing paths are likely to arrive at the remote node out-of-order, because the local node may not send additional write requests concerning the same data sets until the local node receives an acknowledgement that all of the data write requests have been received and flushed to a data storage device.

Figure 6:
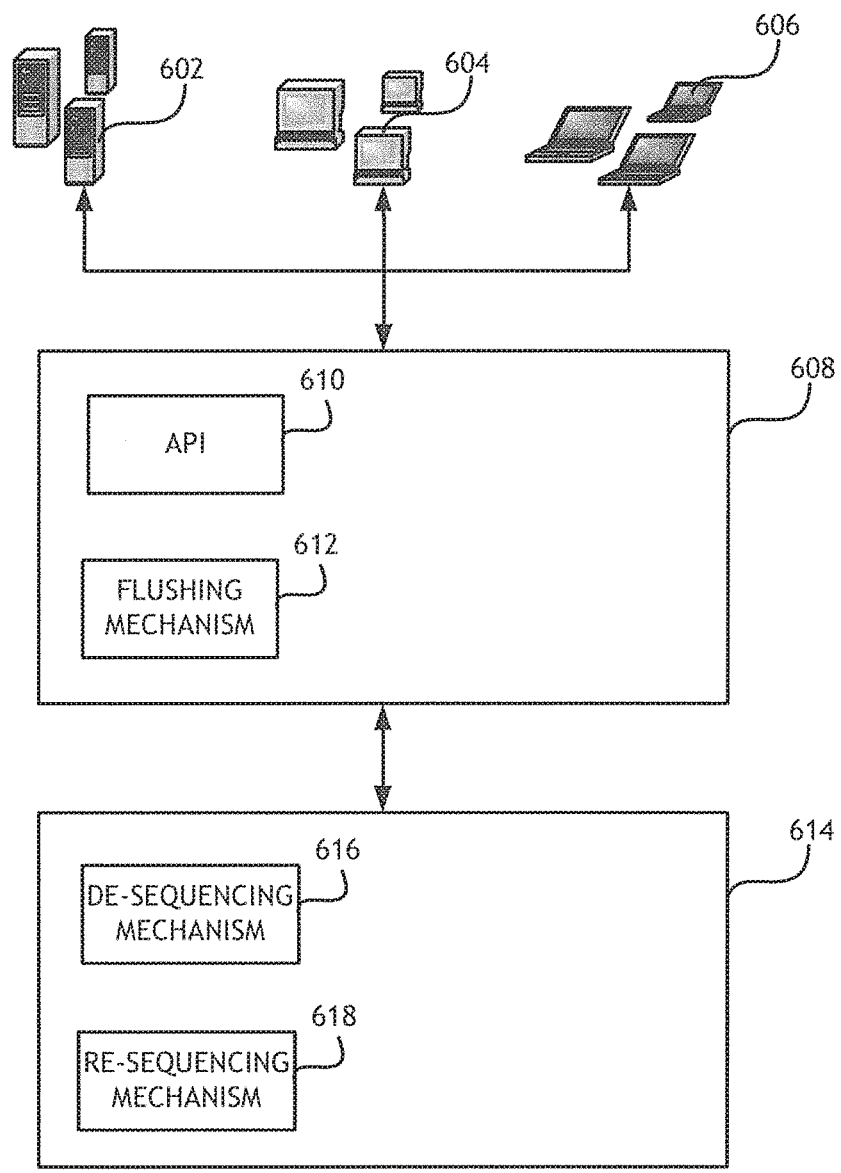
FIG. 6 shows a block diagram of process modules executing embodiments of the present invention.

Referring to FIG. 6, a block diagram of data transmission layers is shown. A RDMA data storage system according to the present invention may be include one or more clients 602, 604, 606, an interconnect layer 608 implemented on one or more of the one or more nodes and a transcript layer 614 implemented on one or more of the one or more nodes. The interconnect layer 608 may incorporate software modules adapted to perform certain features of the present invention; for example, the interconnect layer 608 may include an API module 610 to allow the one or more clients 602, 604, 606 to post transactions to the RDMA data storage system. The interconnect layer 608 may also include a flushing module 612 to initiate a flush operation.

The transaction layer 614 may also incorporate software modules adapted to perform certain features of the present invention; for example, the transaction layer 614 may include a de-sequencing module 616 to separate one or more write operations combined into a single write request so that the one or more write operations may be sent to a remote node over a plurality of available pathways. De-sequencing refers to a process of dividing a serialized stream of data write requests, intended for in-order delivery, into a plurality of individual data write requests that may be delivered out of order through a plurality of data pathways. One or more data write requests may be de-sequenced based on individual data write requests where each data write request has a unique transmit ID, based on uniform data block size, or any other basis suitable for producing individual data write requests that may be delivered in parallel. By de-sequencing one or more write operations, all of the one or more write operations may be sent to a remote node in parallel, thereby increasing write operation throughput as compared to an RDMA system that sends one or more write operations in sequence.

Likewise, the transaction layer 614 may include a re-sequencing module 618 to combine responses and acknowledgments from a remote node, received over a plurality of available pathways in parallel, into a single response in a format expected by the one or more clients 602, 604, 606.

Each of the modules incorporated into the interconnect layer 608 and the transaction layer 614 may be executed by a process thread executing on a processor in a node in a RDMA data storage system. It will be appreciated by one skilled in the art that modules incorporated into the interconnect layer 608 may be executed on one node in an RDMA data storage system while modules in the transaction layer 614 may be executed on a different node in the RDMA data storage system; for example, the modules incorporated into the interconnect layer 608 may be executed by a process thread executing on a remote node. If will further be appreciated that not all modules are necessarily invoked during every data write request.

Figure 7:
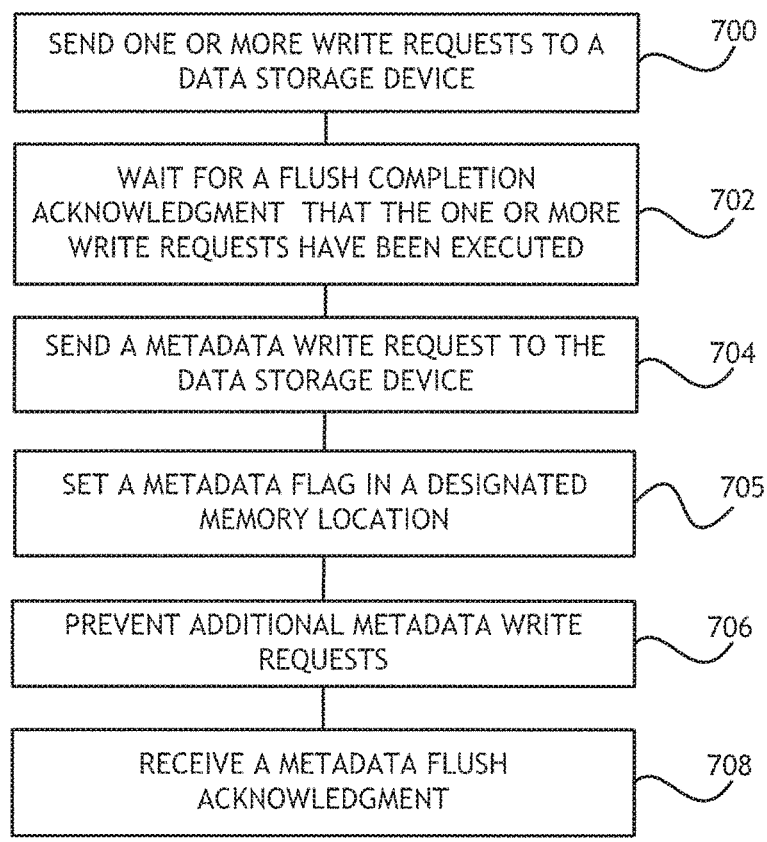
FIG. 7 shows a flowchart of a method for sending data write requests to enforce data integrity according to embodiments of the present invention.

Referring to FIG. 7, a method for sending data write requests in a data storage system to enforce data integrity is shown. A local computer may send 700 one or more data write requests to a remote computer having a data storage device. The local computer may send the one or more data write requests by utilizing an API module provided by an interconnect communications layer on a node in the network. The local computer may then wait 702 for an acknowledgement that the remote computer has flushed the data from the one or more data write requests to the data storage device. The local computer may then send 704 a metadata write request to the data storage device. When sending a metadata write requests, the local computer may set 705 a flag in a predetermined memory location indication that the write request is a metadata write request. A remote node executing write requests may monitor the predetermined memory location to determine if a write request is a metadata write request and process the write request accordingly by ensuring an associated non-metadata write request has been executed and flushed to a storage device, then flushing the metadata to a storage device. The predetermined memory location may be a memory address accessible by both the local computer and the remote node. The local computer may prevent 706 any further metadata write requests until the local computer receives an acknowledgment that the metadata has been flushed to a data storage device. The local computer may then receive 708 an acknowledgment that the metadata has been flushed to a data storage device. The local computer and remote computer may be nodes in a network that enable write operations to a RDMA data storage device.

Figure 8:
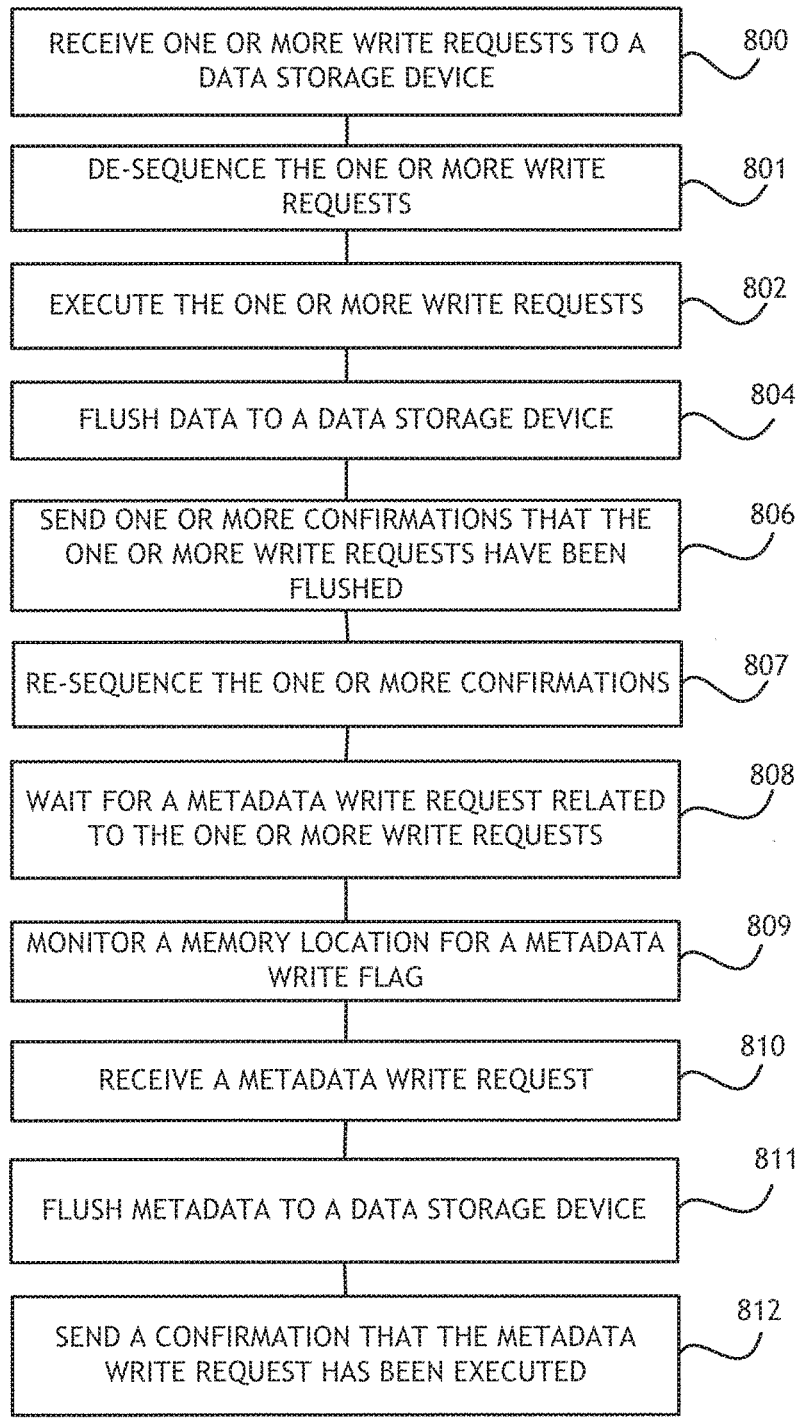
FIG. 8 shows a flowchart of a method for receiving and executing data write requests to enforce data integrity according to embodiments of the present invention.

Referring to FIG. 8, a method for receiving and processing one or more data write requests is shown. A remote computer may receive 800 one or more data write requests to a RDMA data storage device. The remote computer may de-sequence 801 the one or more data write requests so that the one or more data write requests may be transferred in parallel over a plurality of data paths in a network to a RDMA storage device. De-sequencing may be performed by a de-sequencing module in a transaction communications layer of a node in the network. The remote computer may execute 802 the one or more data write requests. The one or more write requests may be executed to a cache for subsequent flushing to a storage device. Where a remote node receives a plurality of data write requests in parallel, the remote node may place each data write request in a queue. Each data write request may be associated with a transmit ID. Transmit IDs uniquely identify each write request. When the one or more data write requests have been executed, the remote computer may flush 804 the data from the one or more data write requests to a data storage device. Flushing may be initiated by a flushing module in a flushing module in an interconnect communications layer on a node in the network, including the remote computer. The remote computer may then send 806 one or more acknowledgements that the one or more data write requests have been flushed and wait 808 for a metadata write request related to the one or more data write requests. Where the one or more acknowledgements include acknowledgements for a plurality of transmit IDs, a re-sequencing module in a transaction communications layer on a node in the network, including the remote computer, may re-sequence 807 the one or more acknowledgements so that the one or more acknowledgements may be received in a sequence expected by a local computer. Re-sequencing may be based on the transmit ID of the data write request associated with each acknowledgement. The remote computer may monitor 809 a specific location in a memory for a metadata write flag, indicating that a write operation is a metadata write operation. The remote computer may then receive 810 and execute one or more metadata write requests. Metadata may be written to a cache for subsequent flushing to a storage device. The remote computer may then flush 611 the metadata to the data storage device and send 812 an acknowledgment that the metadata write request has been executed.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
   flushing data associated with a first data write request, received through a first connection path from a local node and executed to a cache, and the second data write request, received through a second connection path from the local node and executed to the cache, to memory;
   executing a metadata write request after the data is flushed based upon an indicator being set to indicate that the metadata write request comprises metadata related to the data; and
   re-sequencing and sending a first acknowledgement that first data of the first data write request has been flushed and a second acknowledgement that second data of the second data write request has been flushed to the local node in a sequence expected by the local node,
   wherein the sequence of sending the first and second acknowledgments is determined based upon transmit identifiers derived from uniform data block sizes of the first data write request and the second data write request.

2. The method of claim 1, wherein the first data write request is associated with a first transmit ID and the second data write request is associated with a second transmit ID.

3. The method of claim 2, wherein the first acknowledgement is associated with the first transmit ID and the second acknowledgement is associated with the second transmit ID.

4. The method of claim 3, comprising: re-sequencing the first acknowledgment and the second acknowledgement based upon the first transmit ID and the second transmit ID.

5. The method of claim 1, comprising: monitoring a pre-determined memory storage location to identify the indicator.

6. The method of claim 5, wherein the pre-determined memory storage location is accessible by the local node.

7. The method of claim 5, wherein the method is performed at a remote node and the pre-determined memory storage location is accessible by the remote node and the local node.

8. The method of claim 1, comprising: determining that a next write request corresponds to the metadata write request comprising the metadata related to the data based upon the indicator at a pre-determined memory storage location being set.

9. The method of claim 5, comprising: executing the metadata write request after the first data write request and the second data write request have been executed.

10. The method of claim 1, wherein the first data write request is associated with a first transmit ID used to re-sequence the first and second acknowledgments.

11. A non-transitory machine readable medium comprising instructions for performing a method, which when executed by a machine, causes the machine to:
 flush data associated with a first data write request, received through a first connection path from a local node and executed to a cache, and the second data write request, received through a second connection path from the local node and executed to the cache, to memory;
 execute a metadata write request after the data is flushed based upon an indicator being set to indicate that the metadata write request comprises metadata related to the data; and
 re-sequence and send a first acknowledgement that first data of the first data write request has been flushed and a second acknowledgement that second data of the second data write request has been flushed to the local node in a sequence expected by the local node,
 wherein the sequence of sending the first and second acknowledgments is determined based upon transmit identifiers derived from uniform data block sizes of the first data write request and the second data write request.

12. The non-transitory machine readable medium of claim 11, wherein the first data write request is associated with a first transmit ID and the second data write request is associated with a second transmit ID.

13. The non-transitory machine readable medium of claim 12, wherein the first acknowledgement is associated with the first transmit ID and the second acknowledgement is associated with the second transmit ID.

14. The non-transitory machine readable medium of claim 13, wherein the instructions cause the machine to: re-sequence the first acknowledgment and the second acknowledgement based upon the first transmit ID and the second transmit ID.

15. The non-transitory machine readable medium of claim 11, wherein the instructions cause the machine to: monitor a pre-determined memory storage location to identify the indicator.

16. A computing device comprising:
 a memory comprising machine executable code having stored thereon instructions for performing a method; and
 a processor coupled to the memory, the processor configured to execute the machine executable code to cause the processor to:
 receive a first data write request through a first connection path and a second data write request through a second connection path from a local node;
 execute the first data write request and the second data write request to cache;
 flush data associated with the first data write request and the second data write request to memory;
 execute a metadata write request after the data is flushed based upon an indicator being set to indicate that the metadata write request comprises metadata related to the data;
 generate a first acknowledgement that first data of the first data write request and a second acknowledgement that second data of the second data write request have been flushed; and
 re-sequence and send the first acknowledgement and the second acknowledgement to the local node in a sequence expected by the local node,
 wherein the sequence of sending the first and second acknowledgments is determined based upon transmit identifiers derived from uniform data block sizes of the first data write request and the second data write request.

17. The computing device of claim 16, wherein the machine executable code causes the processor to: monitor a pre-determined memory storage location to identify the indicator.

18. The computing device of claim 17, wherein the machine executable code causes the processor to: execute the metadata write request after the first data write request and the second data write request have been executed.

19. The computing device of claim 17, wherein the machine executable code causes the processor to:
 re-sequence the first acknowledgement and the second acknowledgement based upon transmit identifiers of the first data write request and the second data write request.

20. The computing device of claim 17, wherein the pre-determined memory storage location is accessible by a remote node and the local node.

* * * * *